(12) United States Patent
Xu et al.

(10) Patent No.: US 11,866,897 B2
(45) Date of Patent: Jan. 9, 2024

(54) MAIN STREAM RESERVOIR ECOLOGICAL MODULATION METHOD CONSIDERING INCOMING WATER FROM INTERVAL TRIBUTARIES

(71) Applicants: CHINA THREE GORGES CORPORATION, Beijing (CN); CHANGJIANG RIVER SCIENTIFIC RESEARCH INSTITUTE, Hubei (CN)

(72) Inventors: Jijun Xu, Hubei (CN); Huichao Dai, Beijing (CN); Chunhua Yang, Hubei (CN); Zhengjie Yin, Hubei (CN); Qingqing Li, Hubei (CN); Zhiwu Liu, Beijing (CN); Dingguo Jiang, Beijing (CN); Hanqing Zhao, Beijing (CN)

(73) Assignees: CHINA THREE GORGES CORPORATION; CHANGJIANG RIVER SCIENTIFIC RESEARCH INSTITUTE

( * ) Notice: Subject to any disclaimer, the term of this patent is extended or adjusted under 35 U.S.C. 154(b) by 0 days.

(21) Appl. No.: 17/625,311

(22) PCT Filed: Apr. 29, 2021

(86) PCT No.: PCT/CN2021/090805
§ 371 (c)(1),
(2) Date: Jan. 6, 2022

(87) PCT Pub. No.: WO2021/238567
PCT Pub. Date: Dec. 2, 2021

(65) Prior Publication Data
US 2023/0340742 A1    Oct. 26, 2023

(30) Foreign Application Priority Data

May 27, 2020   (CN) .......................... 202010460654.8

(51) Int. Cl.
*E02B 3/02* (2006.01)
*E02B 1/02* (2006.01)

(52) U.S. Cl.
CPC . *E02B 3/02* (2013.01); *E02B 1/02* (2013.01)

(58) Field of Classification Search
CPC .................................. E02B 1/02; E02B 3/02
See application file for complete search history.

(56) References Cited

U.S. PATENT DOCUMENTS

2020/0315144 A1* 10/2020 He ............................. E02B 7/02

FOREIGN PATENT DOCUMENTS

| AU | 2021103039 A4 * | 7/2021 | |
| WO | WO-2021238567 A1 * | 12/2021 | ............... E02B 1/02 |

* cited by examiner

*Primary Examiner* — Kyle Armstrong

(57) ABSTRACT

A main stream reservoir ecological modulation method considering incoming water from interval tributaries is provided. The method determines the contribution ratio of the incoming water from interval tributaries to first-day's water rising in a high-flow surge process and when to start ecological modulations of spawning ground sections, determines a river course routing method after a main stream and its tributaries joining and calibrating parameters, based on past hydrological data, performing river flow calculation on the discharge volume of upstream reservoirs and the flow after interval tributaries joining, and determines a main stream reservoir ecological modulation mode considering incoming water from interval tributaries.

5 Claims, 2 Drawing Sheets

MAIN STREAM RESERVOIR ECOLOGICAL MODULATION METHOD CONSIDERING INCOMING WATER FROM INTERVAL TRIBUTARIES

FIELD

The invention relates to the technical field of water resources management and water ecology, in particular to a main stream reservoir ecological modulation method considering incoming water from interval tributaries.

BACKGROUND

Whether the fish laying pelagic eggs spawn during a spawning period closely depends on the high-flow surge process in a river, during which water is rising with the most spawning amount. As the large-scale reservoirs on rivers have been built and operated, the reservoirs have undertaken comprehensive utilization tasks such as flood control and peak regulation, and have changed the natural hydrological runoff patterns of downstream river courses. The original high-flow surge duration, frequency, peak value and other parameters of river courses have changed a lot, putting a greater impact on spawning of the fish laying pelagic eggs in downstream reaches. Furthermore, most of the current study and experiments on reservoir ecological modulation are carried out based on the inflow volume and modulation rule of a main stream reservoir, often neglecting the effect of incoming water from interval tributaries, so that the water discharging process of a reservoir does not match the interval water-rising processes, resulting in the failure of the ideal high-flow surge in water-rising process at the spawning ground sections of downstream river courses, and the difficulties to achieve the expected effect of the ecological modulation. Therefore, it is urgent to provide a method, by which we can improve the high-flow surge processes of downstream river courses by optimizing the modulation manner of a main stream reservoir based on the consideration of the incoming water process of interval tributaries, so as to promote the natural reproduction of fish during a spawning period, and which meets the hydrological conditions required for the mass reproduction of the fish laying pelagic eggs in spawning grounds, and keeps rivers lively.

SUMMARY

The objective of the present invention is to solve the problem that the conventional reservoir modulation method cannot realize the high-frequency and high-flow surge process generated by downstream river courses, on the base of the natural high-flow surge patterns encountered by a river's main stream and its tributaries for many years, so as to provide a main stream reservoir ecological modulation method considering incoming water from interval tributaries, by which we can improve the high-flow surge process of downstream spawning grounds by optimizing the modulation manner of a main stream reservoir, and ameliorate the hydrological conditions required for the mass reproduction of the fish laying pelagic eggs, and which promotes the natural reproduction of the fish laying pelagic eggs.

The present invention provides a main stream reservoir ecological modulation method considering incoming water from interval tributaries, comprising the following steps.

Step 1 of determining the contribution ratio of the incoming water from interval tributaries to first-day's water rising in a high-flow surge process and when to start ecological modulations of spawning ground sections, wherein this steps specifically includes the following sub steps.

(1) determining target fish's ecological and hydrological parameters of spawning ground sections, according to target fish's spawning monitoring data of spawning grounds and hydrological data, determining target fish's ecological and hydrological parameters of spawning ground controlled sections, that is, determining the values of a rising flow $Q_e$, an initial increase of water levels $Z_e$, a peak flow $Q_m$, an average flow increase dQ, and a duration of water rising D.

(2) calculating the contribution ratio of the incoming water from interval tributaries to the first-day's water rising in a high-flow surge process, according to the long series of restored hydrological runoff data, calculating the frequency of high-flow surge processes in downstream spawning grounds, analyzing the influence of the incoming water from an upstream main stream and interval tributaries on the high-flow surge processes in downstream spawning grounds, determining the contribution ratio R of the incoming water from interval tributaries to the first-day's water rising in the high-flow surge process of spawning grounds.

(3) determining when to start ecological modulations, according to the hydrological runoff data of the controlling stations at a main stream and its tributaries, simulating a high-flow surge generation process by the IHA method, in the case that the contribution ratio R of the incoming water from interval tributaries to the first-day's water rising in the high-flow surge process of spawning grounds is greater than a threshold θ during fish spawning, selecting the rising flow $Q_e$, the average flow increase dQ, and the duration of water rising D of interval tributaries as control indexes for starting ecological modulations, thus the starting time st for starting ecological modulations being judged according to the process of the water rising of and the incoming water from tributaries; in the case that the contribution ratio R of the incoming water from interval tributaries to the first-day's water rising in the high-flow surge process of spawning grounds is not greater than a threshold θ during fish spawning, selecting the rising flow $Q_e$, the average flow increase dQ, and the duration of water rising D of a main stream as control indexes for starting ecological modulations, thus the starting time st for starting ecological modulations being judged according to the water rising of a main stream.

Step 2 of determining a river course routing method after a main stream and its tributaries joining and calibrating parameters, based on past hydrological data, performing river flow calculation on the discharge volume of upstream reservoirs and the flow after interval tributaries joining, taking into account the inflow of other small tributaries, performing river flow calculation by the Muskingen model considered with the inflow of side branches; the location schematic diagram of main stream and its tributaries and spawning ground is shown in FIG. 1

Step 3 of determining a main stream reservoir ecological modulation mode considering incoming water from interval tributaries, wherein this step specifically includes the following sub steps.

(1) building the high-flow surge frequency simulation model of spawning ground sections, according to the high-flow surge composition of spawning ground sections and the contribution ratio of the incoming water from interval tributaries to the first-day's water rising in the high-flow surge process, determining a main stream reservoir ecological modulation mode, so as to maximize the artificial high-flow surge frequency H, that is, max|H|, where H is the determined high-flow surge frequency of spawning ground-controlled sections calculated by the ecological modulation method considering incoming water from interval tributaries.

(2) determining the ecological modulation mode of the main stream reservoir coordinated to the interval incoming water, in order to coordinate to the interval incoming water to make the high-flow surge frequency H of the controlled section as large as possible, solving the outflow process of the main stream reservoir through optimization, and the outflow Qoutst+j+1 of the main stream reservoir during st+j+1 period being deduced as Formula (3), $$Qsy_{st+j+1}=d_0(Qout_{st+j+1}Qmj_{st+j+1})+d_1(Qout_{st+j}+Qmj_{st+j})+d_2Qsy_{st+1}Qout_{st+j+1}=(Qsy_{st+j+1}-d_1(Qout_{st+j}+Qmj_{st+j})-d_2Qsy_{st+j})/d_0-Qmj_{st+j+1} \quad (3)$$

where $Qsy_{st+j}$ refers to the composite flow of the spawning ground controlled section, $Qmj_{st+1}$, refers to the flow of interval tributaries, and st is the starting period of ecological modulations, which is determined by water rising of a main stream or interval tributaries, that is, during fish spawning period $\beta > \theta$ in the case that the water rising process with a continuous water rising process for not less than D days, an average flow increase of not less than dQ, and a corresponding rising flow of not less than $Q_e$ occurs at a forecasted interval tributary, a main stream reservoir starts the ecological compensation modulation considering interval incoming water on the first day of interval water-rising, during $\beta \leq \theta$ in the case that the water rising process with a continuous water rising process for not less than D days, an average flow increase of not less than dQ, and a corresponding rising flow of not less than $Q_e$ occurs at a forecasted main stream, a main stream reservoir starts the ecological compensation modulation considering interval incoming water on the first day of main stream water-rising.

Further, in Step1, the starting time st for starting ecological modulations is judged according to the process of the water rising of and the incoming water from tributaries, that is, in the case that the water rising process with a continuous water rising process for not less than D days, an average flow increase of not less than dQ, and a rising flow of not less than $Q_e$ occurs at an interval tributary, the main stream reservoir begins to start the compensation modulation to meet the requirements of the high-flow pulse process required for fish spawning in downstream spawning grounds; the starting time st for starting ecological modulations is judged according to water rising in a main stream, that is, in the case that the water rising process with a continuous water rising process for not less than D days, an average flow increase of not less than dQ, and a rising flow of not less than $Q_e$ occurs at a main stream, the main stream reservoir begins to start the compensation modulation considering interval tributaries to meet the requirements of the high-flow pulse process required for fish spawning in downstream spawning grounds.

Further, in Step 1, the duration of water rising D is the high-flow surge duration corresponding to 75% of the frequency of the high-flow surge required for fish spawning; the rising flow $Q_e$ and the average flow increase dQ are selected according to a frequency method and a maximum-minimum method, the frequency method is to assign the rising flow $Q_e$ and the average flow increase dQ to 75% of the high-flow surge of a main stream or interval tributaries during a spawning period, the maximum-minimum method is to select the maximum average flow increase in a main stream or interval tributaries during each spawning period and the corresponding rising flow, and choose the average flow increase of continuous water rising and the corresponding minimum rising flow as the values of the average flow increase dQ of continuous water rising and corresponding rising flow $Q_e$.

Further, in Step 2, the formula of the river flow calculation is Formula as follows:

$$Q_{down,2} = d_0 Q_{up,2} + d_1 Q_{up,1} + d_2 Q_{down,1} \quad (1)$$

$$d_0 = (1+a)\frac{\frac{1}{2}\Delta t - kx}{k - kx + \frac{1}{2}\Delta t}, \quad d_1 = (1+a)\frac{\frac{1}{2}\Delta t + kx}{k - kx + \frac{1}{2}\Delta t},$$

$$d_2 = (1+a)\frac{k - \frac{1}{2}\Delta t - kx}{k - kx + \frac{1}{2}\Delta t}$$

where $Q_{down,2}$ is interval end flow of a downstream spawning ground controlled section, $Q_{up,2}$ is interval end flow of a upstream main stream-tributary-joint section, $Q_{up,1}$ is interval beginning flow of a upstream main stream-tributary-joint section, $Q_{down,1}$ is interval beginning flow of a downstream spawning ground controlled section, $\Delta t$ is a calculation interval, k is a storage flow-discharge relationship curve, x is a flow proportion factor, $\alpha$ is a contribution ratio of the incoming water of interval tributaries to the joint section, and the coefficients of the river flow calculation $d_0$, $d_1$ and $d_2$ are calibrated by Least Square Method according to the long series of flow measured over many years.

Further, in Step 3, according to the main stream reservoir compensation modulation considering incoming water from interval tributaries, the high-flow surge frequency H of the spawning ground controlled section considering incoming water from interval tributaries is calculated, when the composite flow of spawning ground sections meets the following conditions as Formula, it is counted as 1 surge act, $$Qsy_{st+i} < Q_{st+i+1} - dQ, \ i=0,1,\ldots \text{day}$$

$$Qsy_{st+1} - Qsy_{st} > Ze$$

$$Qsy_{st} > Qe$$

$$\max(Qsy_{st+i} \ldots Qsy_{st+day}) > Qm$$

where the values of the rising flow $Q_e$, the initial increase of water levels $Z_e$, the peak flow $Q_m$, the average flow increase dQ and the duration of water rising D come from Step 1.

The present invention has the following advantages: (1) by considering incoming water from interval tributaries, we can solve the problem of insufficient frequency of high-flow surge processes in downstream river courses caused by conventional modulation, effectively improve the high-flow surge process of downstream river courses, so as to meet the hydrological conditions required for the mass reproduction of the fish laying pelagic eggs in spawning grounds; (2) the high-flow surge frequency simulation model of spawning ground sections can be built to quickly simulate the high-flow surge process of the downstream spawning ground sections in various modulation plans, and the optimal ecological modulation mode of the main stream reservoir can be solved through optimization.

DETAILED DESCRIPTION

Figure 1:
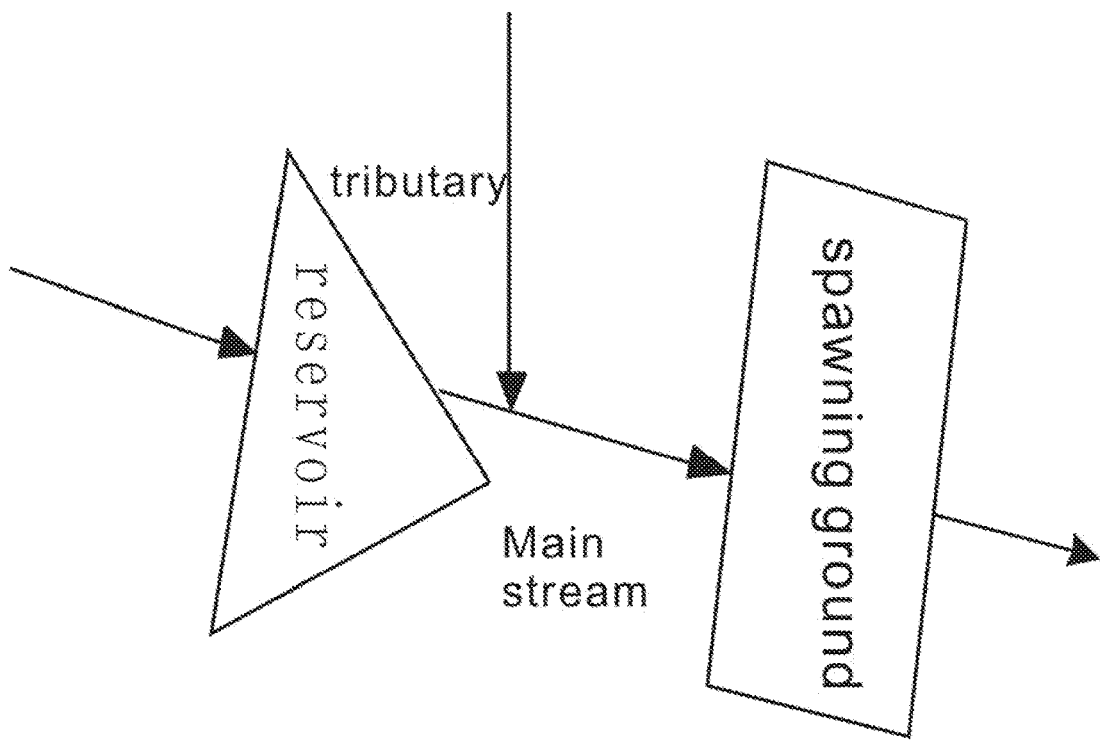
FIG. 1 is a topological relationship diagram of the water system of a river's main stream and its tributaries.

The embodiments of the present invention will be described in detail in combination with the drawings, and the technical solutions of the present invention will be described clearly and completely. However, such descriptions do not impose limitations on the present invention, only as examples, furthermore, make the advantages of the present invention clearer and easier to be understood.

The present invention takes the ecological modulation of the fish laying pelagic eggs perching in Xiangjiaba-~Chongqing Reach in the downstream of the Jinsha River as an example, adopting the method which also has a guiding significance for the ecological modulation of other rivers, provided by the present invention for detailed descriptions.

Sichuan-Chongqing Reach along the Jinsha River from Yibin to Chongqing is a national nature reserve for the rare and peculiar fish in the upper reaches of the Yangtze River, with about 387 km in length, the hydropower stations such as Xiluodu and Xiangjiaba in its upper reaches, and the Minjiang River, the Chishui River, the Tuojiang River and other larger tributaries among this reach, in which the representative fish laying pelagic eggs include golden loaches and elongate loaches, and in the downstream of which their spawning grounds are near Zhutuo Station. As the Xiangjiaba and Xiluodu hydropower stations were successively built and put into use in 2012, the runoff patterns of the Sichuan~Chongqing downstream reach have been changed to a great extent, and especially affect the ecological and hydrological process during the spawning period of the nature reserve from May to July, making against the natural reproduction of the fish laying pelagic eggs.

The example of the present invention provides a main stream reservoir ecological modulation method considering incoming water from interval tributaries, which includes the following steps.

Step 1: determining the start-up index of the ecological modulation of spawning ground sections and the ratio of the contribution to the incoming water from tributaries.

1. Determining the ecological and hydrological parameters of spawning ground sections.

According to the currently available fish-spawned monitoring data and hydrological data (2009-2015) in spawning grounds, a high-flow surge process has to occur at Zhutuo Station in May and mid-June to early-July, respectively, to meet the requirements of the fish laying pelagic eggs. Specific ecological and hydrological requirements are as follow. The daily flow increase of the main stream high-flow at Zhutuo Station, that is, the average flow increase dQ is assigned to 700 in May, and 760 during mid-June to early-July. The duration of continuous incoming water with high-flow surges, that is, the duration of water rising D is assigned to 2 in May, and 3 during mid-June to early-July. The first-day's water rising, that is, the initial increase of water levels $Z_e$ is assigned to 900 in May, and 1200 during mid-June to early-July. The rising flow $Q_e$ is assigned to 3900 in May, and 6500 during mid-June to early-July. The peak flow $Q_m$ is assigned to 6200 in May, and 14000 during mid-June to early-July.

2. Calculating the contribution ratio of the incoming water from interval tributaries to the first-day's water rising in the high-flow surge process.

The Minjiang River among tributaries has a relatively large drainage area under control, and the amount of incoming water from April to July from 1954 to 2012 accounted for 34.93% of Zhutuo Station. There were 240 simultaneous high-flow surges at Gaochang Station of the Minjiang River among 247 high-flow surges occurred at Zhutuo Station in the main stream of the Yangtze River, accounting for 97.17% of the high-flow surges at Zhutuo Station. The average ratio β of the Minjiang River's contribution to Zhutuo Station's first-day's water rising with high-flow surges from April to July is 36.7% through calculations. The measured data over the years show that at least one high-flow surge of the Minjiang River encounters the high-flow surge of Zhutuo Station every year, contributing a lot to the first-day's water rising of Zhutuo Station with high-flow surges.

3. Determining when to start ecological modulations.

The high-flow surge-generating processes for the hydrological runoff process of Jinsha River Pingshan Station (now Xiangjiaba Station) and Minjiang Gaochang Station from 1954 to 2012 were simulated by adopting the IHA method. Because the average ratio β (36.7%) of the Minjiang River's contribution to Zhutuo Station's first-day's water rising with high-flow surges from April to July is greater than the threshold (30%), the starting period of ecological modulations st was judged by water rising at the Minjiang River, that is, the water rising process with a continuous water rising process for not less than 2 days, an average flow increase of not less than 290 m³/s, and a corresponding rising flow of not less than 1413 m³/s occurred at the forecasted interval of the Minjiang River in May; the water rising process with a continuous water rising process for not less than 2 days, an average flow increase of not less than 2495 m³/s, and a corresponding rising flow of not less than 2330 m³/s occurred during mid-June to early-July. When meeting the above-mentioned ecological modulation starting conditions, the Xiluodu and Xiangjiaba reservoirs in the main stream of the Jinsha River will start an ecological compensation modulation on the first day of water rising at the Minjiang River.

Step 2: determining a river course routing method after a main stream and its tributaries joining and calibrating parameters.

Based on the daily runoff data derived from Xiangjiaba Station (original Pingshan Station), Gaochang Station, and Zhutuo Station during 1954~April to July 2012, the distance difference between Xiangjiaba Station and Gaochang Station to the junction of the Jinsha River and the Minjiang River is not very large, so the flow at Zhutuo Station on the lower section is calculated by the Muskingen model, while the runoffs at Xiangjiaba Station (original Pingshan Station) and Gaochang Station are directly added together as the flow on the upper section. In addition to the Jinsha River and the Minjiang River, there are tributaries such as the Chishui River, the Tuojiang River, and the Hengjiang River in the upstream of Zhutuo Station, thus for the Muskingen model considered with the inflow of side branches, the Least Square Method is used to calculate deduction parameters d0, d1, and d2 to give d0=0.150, d1=0.495, d2=0.437, with the fitting correlation coefficient of R=0.994, so the fitting effect is better.

Step 3: Determining a main stream reservoir ecological modulation mode considering incoming water from interval tributaries.

1. Building the high-flow surge frequency simulation model of spawning ground sections.

We maximized the artificial high-flow surge frequency H at Zhutuo Station in the spawning ground, that is, max|H|. In this expression, H is the determined high-flow surge frequency of the spawning ground-controlled section calculated by the ecological modulation method considering incoming water from the tributary of the Minjiang River. When the composite flow of spawning ground sections $Qsy_{st+j}$ meets the following conditions, it is counted as 1 surge act.

$Qsy_{st+i} < Q_{st+i+1} - dQ, i=0,1,\ldots$ day $Qsy_{st+1} - Qsy_{st} > Z_e$ $Qsy_{st} > Q_e$ $\max(Qsy_{st+i} \ldots Qsy_{st+day}) > Q_m$ In the formula, the daily flow increase dQ of the main stream high-flow at Zhutuo Station is assigned to 700 in May, and 760 during mid-June to early-July; the duration day of continuous incoming water with high-flow surges is assigned to 2 in May, and 3 during mid-June to early-July; the first-day's water rising $Z_e$ is assigned to 900 in May, and 1200 during mid-June to early-July; the rising flow $Q_e$ is assigned to 3900 in May, and 6500 during mid-June to early-July; The peak flow $Q_m$ is assigned to 6200 in May, and 14000 during mid-June to early-July.

2. determining the ecological modulation mode of the main stream reservoir coordinated to the interval incoming water.

In order to coordinate to the interval incoming water to make the high-flow surge frequency H of the controlled section as large as possible, the outflow process of the main stream reservoir is solved through optimization, and the outflow Qoutst+j+1 of the main stream reservoir during st+j+1 period is deduced as Formula (3).

$Qsy_{st+j+1} = 0.15*(Qout_{st+j+1} Qmj_{st+j+1}) + 0.495*(Qout_{st+j} + Qmj_{st+j}) + 0.437*Qsy_{st+1} Qout_{st+j+1} = (Qsy_{st+j+1} - 0.495*(Qout_{st+j} + Qmj_{st+j}) - 0.437*Qsy_{st+j})/0.15 - Qmj_{st+j+1}$ (3)

In the formula, $Qsy_{st+j}$ refers to the composite flow of the spawning ground controlled section, $Qmj_{st+j}$ refers to the flow of the Minjiang River in the interval tributary, and st is the starting period of ecological modulations, which is determined by the water rising at the Minjiang River, that is, when the water rising process with a continuous water rising process for not less than 2 days, an average flow increase of not less than 290 m³/s, and a corresponding rising flow of not less than 1413 m³/s occurs at the forecasted interval of the Minjiang River in May; when the water rising process with a continuous water rising process for not less than 2 days, an average flow increase of not less than 2495 m³/s, and a corresponding rising flow of not less than 2330 m³/s occurs during mid-June to early-July, the Xiluodu and Xiangjiaba reservoirs in the main stream of the Jinsha River will start an ecological compensation modulation on the first day of water rising at the Minjiang River.

The years 2000, 2010 and 1986 are selected as the typical high-flow year, normal flow year and low water year for Zhutuo Station. According to the above model, the outflow process of the main stream reservoir is calculated through optimization to get the ecological modulation mode.

Figure 2:
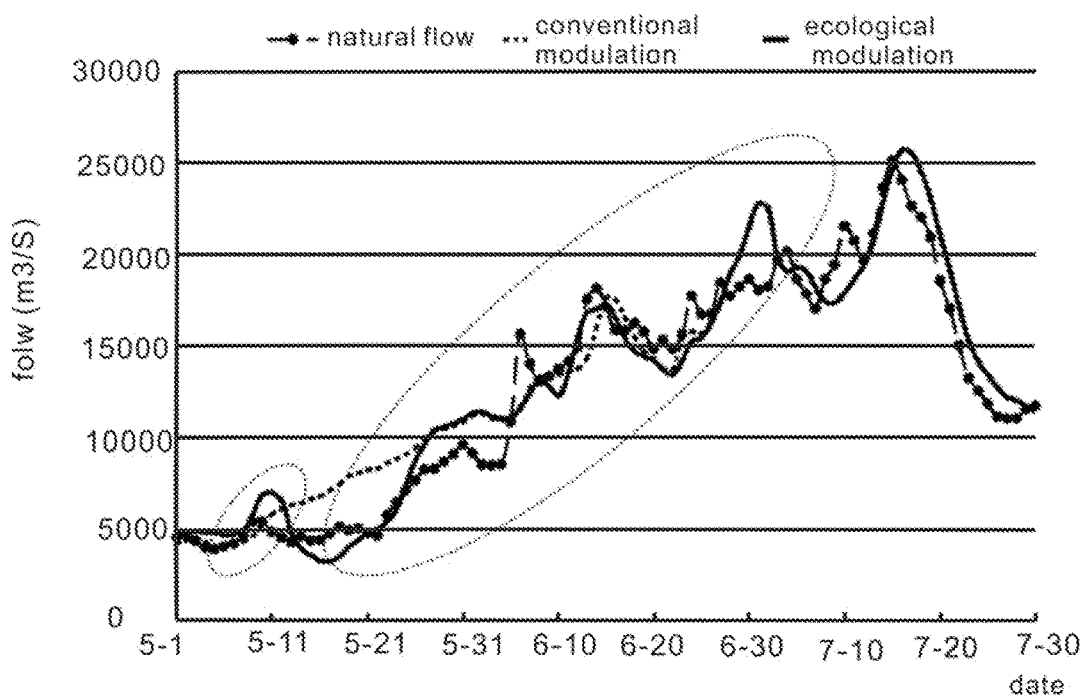
FIG. 2 shows the surge flow process in three instances at Zhutuo Station in 2000.
Figure 3:
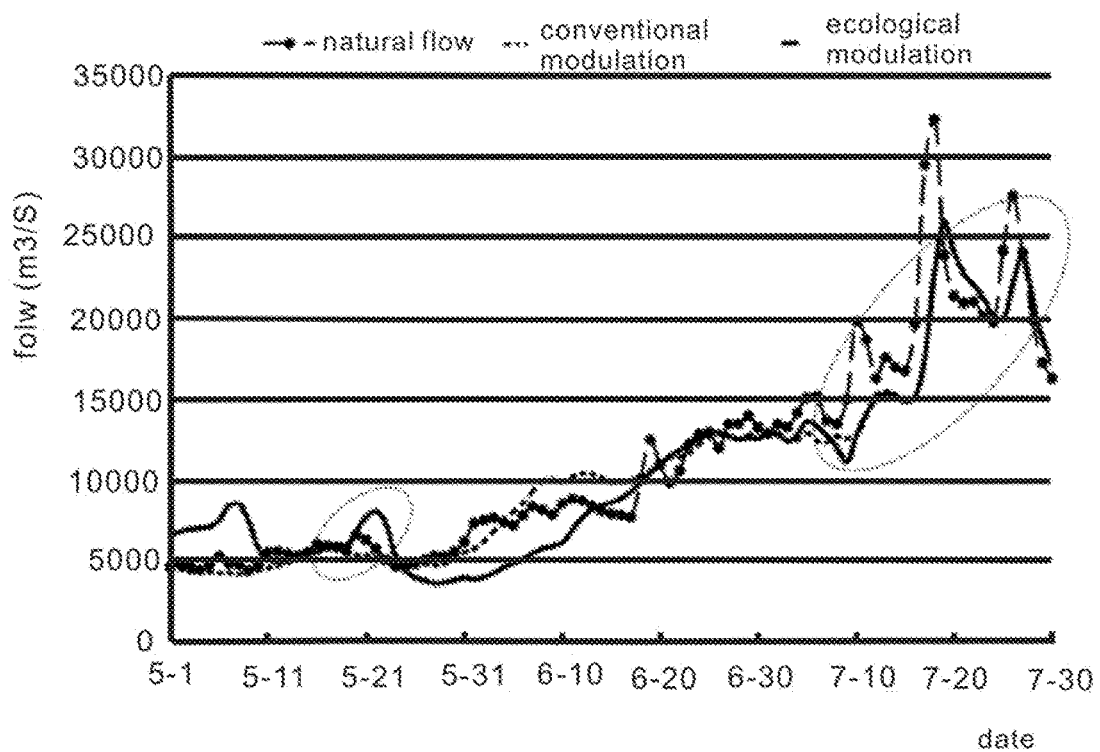
FIG. 3 shows the surge flow process in three instances at Zhutuo Station in 2010.
Figure 4:
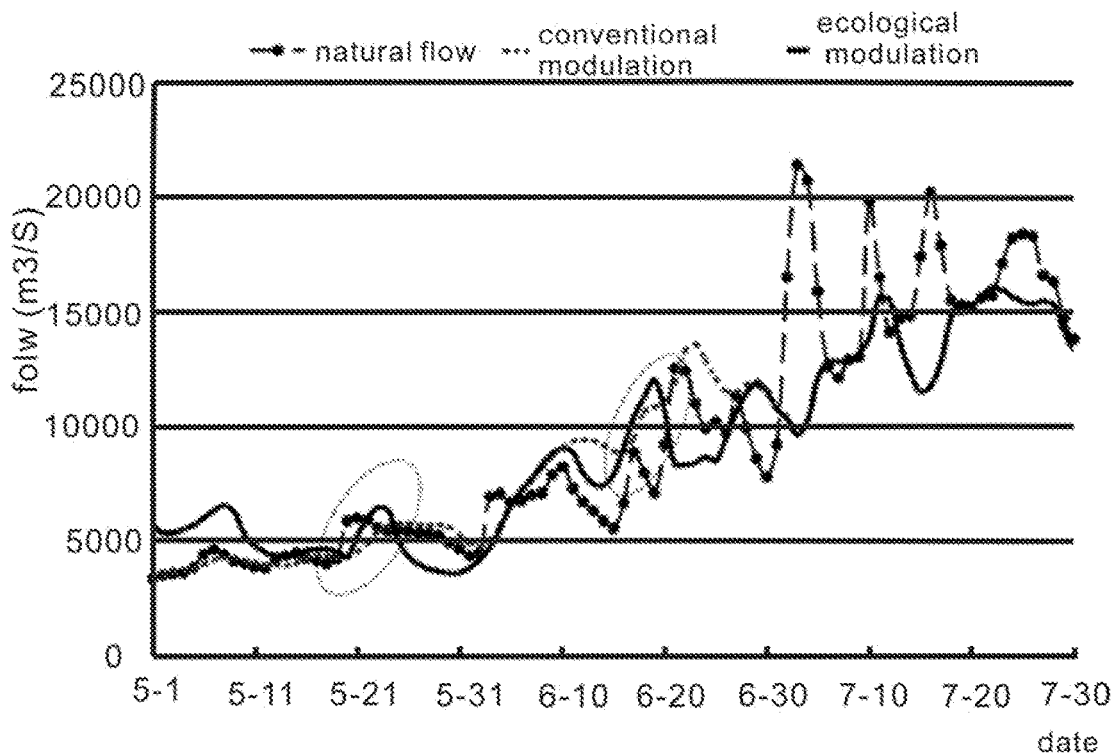
FIG. 4 shows the surge flow process in three instances at Zhutuo Station in 1986.

For the three situations such as a natural situation, a regular modulation and ecological modulation mode considering incoming water from interval tributaries, the high-flow surge frequencies H0, H1 and H of the spawning ground controlled section at Zhutuo station are calculated in sequence. Specifically, according to the long series of hydrological data, the composite rule of incoming water to the spawning ground controlled section under natural conditions is analyzed, and the high-flow surge frequency $H_0$ of the spawning ground controlled section under natural conditions is calculated. According to the regular modulation rule of the main stream reservoir, the high-flow surge frequency $H_1$ of the spawning ground controlled section under the regular modulation is calculated. According to the main stream reservoir compensation modulation considering incoming water from interval tributaries, the high-flow surge frequency H of the spawning ground controlled section considering incoming water from interval tributaries is calculated. The calculation results are shown in Tables 1~3, and the surge process is shown in FIGS. 2~4.

2000: Under natural conditions, 2 high-flow surges occurred at Zhutuo Station, but no high-flow surge occurred in the conventional modulation plan, while the ecological modulation plan guaranteed 2 occurrences of high-flow surges, and each indicator of high-flow surges met the requirements of the continuous water rising process for fish spawning, retaining the frequency of high-flow surges at Zhutuo Station, that is, $H_0=2$, $H_1=0$, $H=2$.

2010: Under natural conditions, 3 high-flow surges occurred at Zhutuo Station, but no high-flow surge occurred in the conventional modulation plan from May to early July, while the ecological modulation plan guaranteed 2 occurrences of high-flow surges, and each indicator of high-flow surges met the requirements of the continuous water rising process for fish spawning, with the average daily increase of high-flows at Zhutuo Station wholly higher than the average daily increase of high-flows under natural conditions, that is, $H_0=3$, $H_1=0$, $H=2$.

1986: Under natural conditions, 4 high-flow surges occurred at Zhutuo Station, 1 high-flow surge occurred in the conventional modulation plan, the ecological modulation plan initiated 2 ecological modulations, resulting in 4 high-flow surge processes at Zhutuo Station, and each indicator of high-flow surges met the requirements of the continuous water rising process for fish spawning, that is, $H_0=4$, $H_1=1$, $H=4$.

In summary, compared with conventional modulations, the main stream reservoir ecological modulation plan provided by the present invention effectively increases the frequency of the high-flow surge process, which is beneficial to the natural reproduction of the fish laying pelagic eggs in spawning grounds.

TABLE 1

Statistical Table of High-flow Surge Characteristics Indexes at Zhutuo Station in 2000 (high-flow year)

| modulation plan | occurrence time | duration/ day | first-day's water rising | rising flow/ m³/s | average flow increase/ m³/s | peak flow/ m³/s | duration of water rising/d |
|---|---|---|---|---|---|---|---|
| natural conditions | 5.22-6.7 | 16 | 24.41% | 4630 | 731 | 15600 | 15 |
|  | 6.12-7.15 | 38 | 17.45% | 4900 | 612 | 25100 | 33 |
| conventional modulation | / | / | / | / | / | / | / |
| ecological modulation | 5.8-5.13 | 5 | 18.43% | 4882 | 700 | 6982 | 3 |
|  | 6.11-7.3 | 23 | 15.00% | 13451 | 946.5 | 17237 | 4 |

TABLE 2

Statistical Table of High-flow Surge Situation at Zhutuo Station in 2000 (normal flow year)

| modulation plan | occurrence time | duration/ day | first-day's water rising | rising flow/ m³/s | average flow increase/ m³/s | peak flow/ m³/s | duration of water rising/d |
|---|---|---|---|---|---|---|---|
| natural conditions | 5.10-5.23 | 13 | 16.99% | 4650 | 187 | 6520 | 10 |
|  | 5.31-6.20 | 20 | 19.44% | 6070 | 333 | 12400 | 19 |
|  | 6.22-7.12 | 20 | 16.19% | 10500 | 517 | 19800 | 18 |
| conventional modulation | / | / | / | / | / | / | / |
| ecological modulation | 5.19-5.24 | 5 | 15.32% | 5875 | 700 | 7974 | 3 |
|  | 7.9-7.28 | 19 | 15.00% | 11009 | 1070 | 25882 | 10 |

TABLE 3

Statistical Table of High-flow Surge Situation at Zhutuo Station in 1986 (low water year)

| modulation plan | occurrence time | duration/ day | first-day's water rising | rising flow/ m³/s | average flow increase/ m³/s | peak flow/ m³/s | duration water rising/d |
|---|---|---|---|---|---|---|---|
| natural conditions | 5.19-6.11 | 23 | 38.95% | 4210 | 181 | 8190 | 22 |
|  | 6.15-6.18 | 3 | 19.68% | 5540 | 1650 | 8840 | 2 |
|  | 6.19-6.23 | 4 | 29.66% | 7080 | 2710 | 12500 | 2 |
|  | 6.30-7.5 | 5 | 18.06% | 7750 | 4550 | 21400 | 3 |
| conventional modulation | 6.4-7.13 | 39 | 15.32% | 5668 | 270 | 15645 | 37 |
| ecological modulation | 5.20-5.25 | 5 | 20.81% | 4325 | 700 | 6425 | 3 |
|  | 6.3-6.13 | 9 | 16.8%% | 4274 | 676 | 9008 | 7 |
|  | 6.15-6.20 | 5 | 15.28% | 7852 | 1037 | 12000 | 4 |
|  | 7.4-7.13 | 9 | 18.07% | 10210 | 776 | 15645 | 7 |

The above are only specific embodiments of the present invention, but the protection scope of the present invention is not limited thereto. All the changes or substitutions that can be easily thought of by any person skilled in the art within the technical scope disclosed by the present invention should cover the protection scope of the present invention. Therefore, the protection scope of the present invention should depend on the protection scope of the claims.

What is claimed is:

1. A main stream reservoir ecological modulation method considering incoming water from interval tributaries, comprising the following steps:

Step 1 of determining a contribution ratio of the incoming water from interval tributaries to first-day's water rising in a high-flow surge process and when to start ecological modulations of spawning ground sections, wherein Step 1 specifically comprises the following sub steps:

(1) determining target fish's ecological and hydrological parameters of spawning ground sections, according to target fish's spawning monitoring data of spawning grounds and hydrological data, determining target fish's ecological and hydrological parameters of spawning ground controlled sections, that is, determining values of a rising flow $Q_e$, an initial increase of water levels $Z_e$, a peak flow $Q_m$, an average flow increase $dQ$, and a duration of water rising $D$;

(2) calculating the contribution ratio of the incoming water from interval tributaries to the first-day's water rising in a high-flow surge process, according to hydrological runoff data of the tributaries, calculating a frequency of high-flow surge processes in downstream spawning grounds, analyzing an influence of the incoming water from an upstream main stream and interval tributaries on the high-flow surge processes in downstream spawning grounds, determining a contribution ratio β of the incoming water from interval tributaries to the first-day's water rising in the high-flow surge process of spawning grounds;

(3) determining when to start ecological modulations, according to the hydrological runoff data of controlling stations at a main stream and its tributaries, simulating a high-flow surge generation process by an IHA method, in a case that the contribution ratio β of the incoming water from interval tributaries to the first-day's water rising in the high-flow surge process of spawning grounds is greater than a threshold θ during fish spawning, selecting the rising flow $Q_e$, the average flow increase dQ, and the duration of water rising D of interval tributaries as control indexes for starting ecological modulations, thus a starting time st for starting ecological modulations being judged according to a process of the water rising of and the incoming water from tributaries; in a case that the contribution ratio β of the incoming water from interval tributaries to the first-day's water rising in the high-flow surge process of spawning grounds is not greater than a threshold θ during fish spawning, selecting the rising flow $Q_e$, the average flow increase dQ, and the duration of water rising D of a main stream as control indexes for starting ecological modulations, thus the starting time st for starting ecological modulations being judged according to the water rising of a main stream;

Step 2 of determining a river course routing method after a main stream and its tributaries joining and calibrating parameters, based on hydrological data, performing river flow calculation on a discharge volume of upstream reservoirs and a flow after interval tributaries joining, taking into account an inflow of other small tributaries, performing river flow calculation by a Muskingen model considered with an inflow of side branches;

Step 3 of determining a main stream reservoir ecological modulation mode considering incoming water from interval tributaries, wherein Step 3 specifically comprises the following sub steps:

(1) building a high-flow surge frequency simulation model of spawning ground sections, according to a high-flow surge composition of spawning ground sections and the contribution ratio of the incoming water from interval tributaries to the first-day's water rising in the high-flow surge process, determining a main stream reservoir ecological modulation mode, so as to maximize an artificial high-flow surge frequency H, that is, max|H|, where H is the determined high-flow surge frequency of spawning ground-controlled sections calculated by the ecological modulation method considering incoming water from interval tributaries;

(2) determining the ecological modulation mode of the main stream reservoir coordinated to the interval incoming water, in order to coordinate to the interval incoming water to make the high-flow surge frequency H of the controlled section as large as possible, solving an outflow process of the main stream reservoir through optimization, and an outflow Qoutst+j+1 of the main stream reservoir during st+j+1 period being deduced as Formula (3), $$Qsy_{st+j+1} = d_0(Qout_{st+j+1}Qmj_{st+j+1}) + d_1(Qout_{st+j} + Qmj_{st+j}) + d_2Qsy_{st+1}Qout_{st+j+1} = (Qsy_{st+j+1} - d_1(Qout_{st+j} + Qmj_{st+j}) - d_2Qsy_{st+j})/d_0 - Qmj_{st+j+1} \quad (3)$$

where $Qsy_{st+j}$ refers to a composite flow of the spawning ground controlled section, $Qmj_{st+j}$ refers to the flow of interval tributaries, and st is a starting period of ecological modulations, which is determined by water rising of a main stream or interval tributaries, that is, during fish spawning period β>θ in a case that a water rising process with a continuous water rising process for not less than D days, an average flow increase of not less than dQ, and a corresponding rising flow of not less than $Q_e$ occurs at a forecasted interval tributary, a main stream reservoir starts an ecological compensation modulation considering interval incoming water on a first day of interval water-rising, during β≤θ in a case that a water rising process with a continuous water rising process for not less than D days, an average flow increase of not less than dQ, and a corresponding rising flow of not less than $Q_e$ occurs at a forecasted main stream, a main stream reservoir starts an ecological compensation modulation considering interval incoming water on a first day of main stream water-rising.

2. The main stream reservoir ecological modulation method considering incoming water from interval tributaries according to claim 1, wherein, in Step1, the starting time st for starting ecological modulations is judged according to the process of the water rising of and the incoming water from tributaries, that is, in the case that the water rising process with a continuous water rising process for not less than D days, an average flow increase of not less than dQ, and a rising flow of not less than $Q_e$ occurs at an interval tributary, the main stream reservoir begins to start the compensation modulation to meet requirements of the high-flow pulse process required for fish spawning in downstream spawning grounds; the starting time st for starting ecological modulations is judged according to water rising in a main stream, that is, in the case that the water rising process with a continuous water rising process for not less than D days, an average flow increase of not less than dQ, and a rising flow of not less than $Q_e$ occurs at a main stream, the main stream reservoir begins to start the compensation modulation considering interval tributaries to meet the requirements of the high-flow pulse process required for fish spawning in downstream spawning grounds.

3. The main stream reservoir ecological modulation method considering incoming water from interval tributaries according to claim 1, wherein, in Step 1, the duration of water rising D is a high-flow surge duration corresponding to 75% of a frequency of the high-flow surge required for fish spawning; the rising flow $Q_e$ and the average flow increase dQ are selected according to a frequency method and a maximum-minimum method, the frequency method is to assign the rising flow $Q_e$ and the average flow increase dQ to 75% of the high-flow surge of a main stream or interval tributaries during a spawning period, the maximum-minimum method is to select the maximum average flow increase in a main stream or interval tributaries during each spawning period and the corresponding rising flow, and to choose the average flow increase of continuous water rising and the corresponding minimum rising flow as the values of the average flow increase dQ of continuous water rising and corresponding rising flow $Q_e$.

4. The main stream reservoir ecological modulation method considering incoming water from interval tributaries according to claim 1, wherein, in Step 2, a formula of the river flow calculation is $$Q_{down,2} = d_0 Q_{up,2} + d_1 Q_{up,1} + d_2 Q_{down,1} \quad (1)$$

$$d_0 = (1+a)\frac{\frac{1}{2}\Delta t - kx}{k - kx + \frac{1}{2}\Delta t}, \quad d_1 = (1+a)\frac{\frac{1}{2}\Delta t + kx}{k - kx + \frac{1}{2}\Delta t},$$

$$d_2 = (1+a)\frac{k - \frac{1}{2}\Delta t - kx}{k - kx + \frac{1}{2}\Delta t}$$

where $Q_{down,2}$ is an interval end flow of a downstream spawning ground controlled section, $Q_{up,2}$ is an interval end flow of a upstream main stream-tributary-joint section, $Q_{up,1}$ is an interval beginning flow of an upstream main stream-tributary-joint section, $Q_{up,1}$ is an interval beginning flow of a downstream spawning ground controlled section, $\Delta t$ is a calculation interval, k is a storage flow-discharge relationship curve, x is a flow proportion factor, a is a contribution ratio of the incoming water of interval tributaries to the joint section, and coefficients of the river flow calculation $d_0$, $d_1$ and $d_2$ are calibrated by Least Square Method according to the long series of flow measured over many years.

5. The main stream reservoir ecological modulation method considering incoming water from interval tributaries according to claim 1, wherein, in Step 3, according to the main stream reservoir compensation modulation considering incoming water from interval tributaries, the high-flow surge frequency H of the spawning ground controlled section considering incoming water from interval tributaries is calculated, when the composite flow of spawning ground sections meets conditions in following Formula, it is counted as 1 surge act, $Qsy_{st+i} < Q_{st+i+1} - dQ, i=0,1,\ldots$ day $Qsy_{st+1} - Qsy_{st} > Ze$ $Qsy_{st} > Qe$ $\max(Qsy_{st+i} \ldots Qsy_{st+day}) > Qm$ where the values of the rising flow $Q_e$, the initial increase of water levels $Z_e$, the peak flow $Q_m$, the average flow increase dQ and the duration of water rising D come from Step 1.

\* \* \* \* \*